Figure 1:
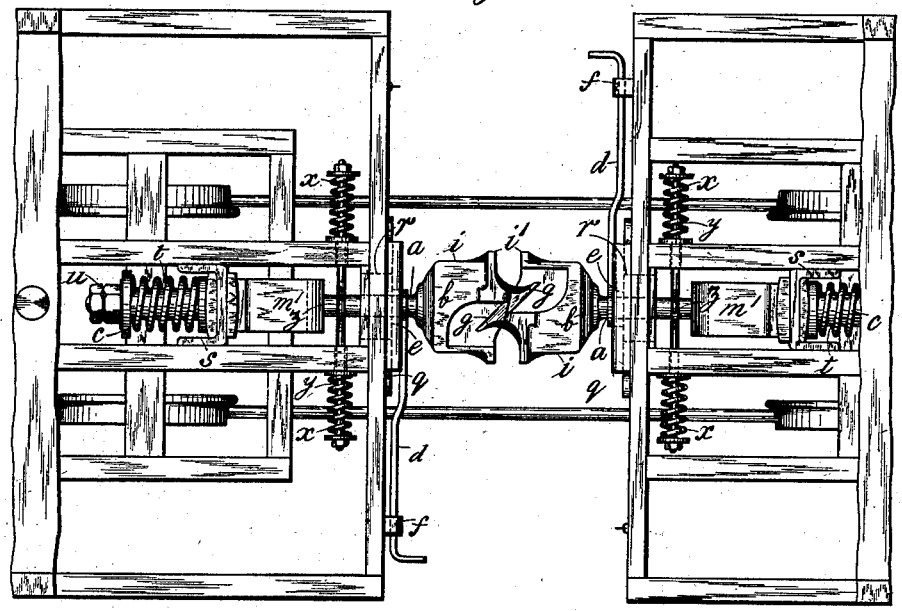

No. 752,605. PATENTED FEB. 16, 1904.
J. THOMAS.
AUTOMATIC COUPLING AND BUFFER.
APPLICATION FILED JUNE 29, 1903.
NO MODEL. 5 SHEETS—SHEET 1.

Witnesses:— Inventor:—
John Thomas,
by Wilkinson & Fisher, Attys

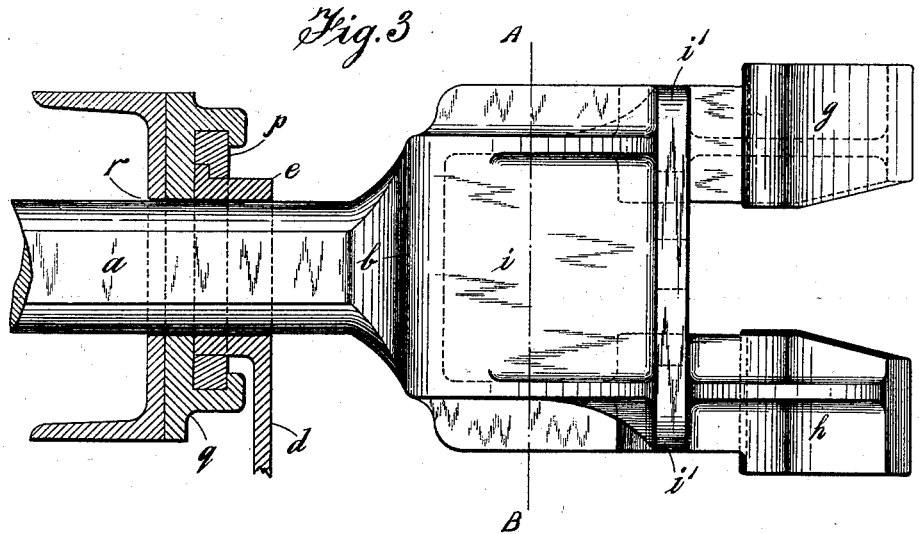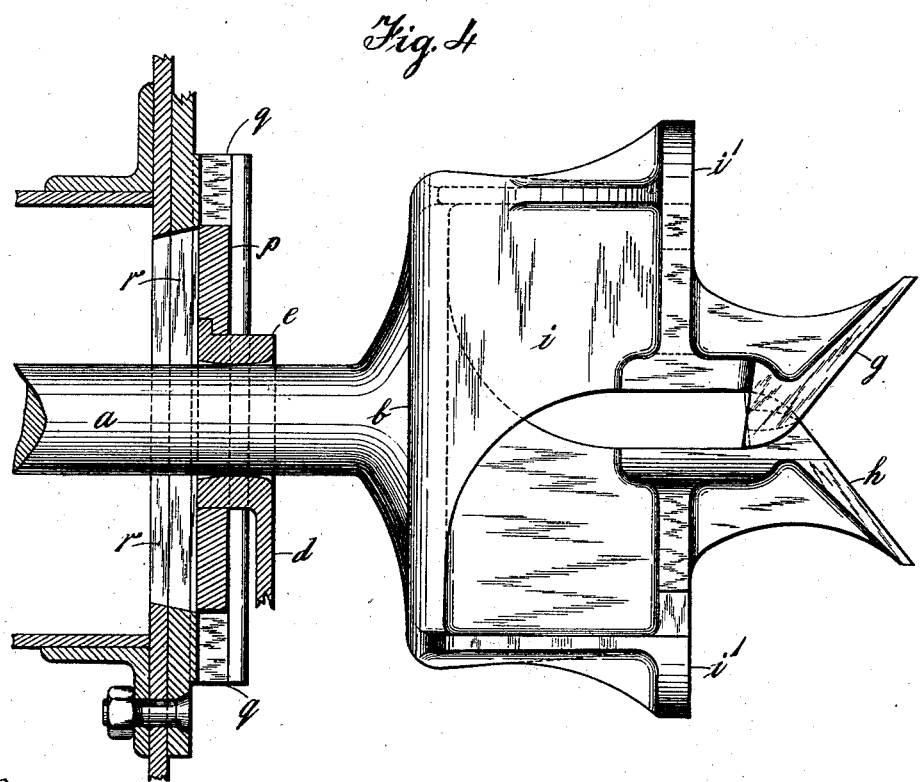

No. 752,605. PATENTED FEB. 16, 1904.
J. THOMAS.
AUTOMATIC COUPLING AND BUFFER.
APPLICATION FILED JUNE 29, 1903.
NO MODEL. 5 SHEETS—SHEET 3.
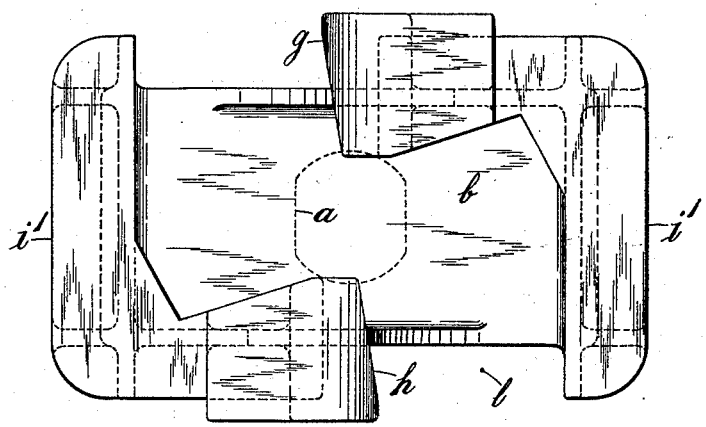
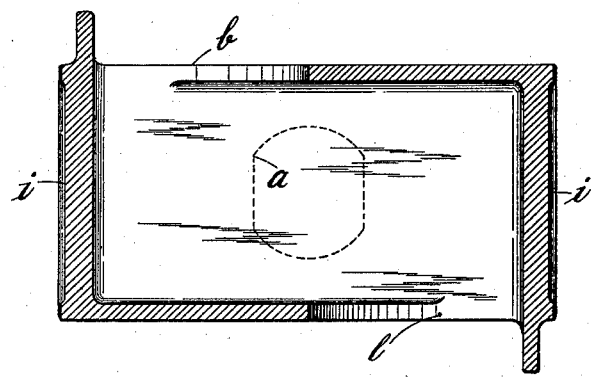
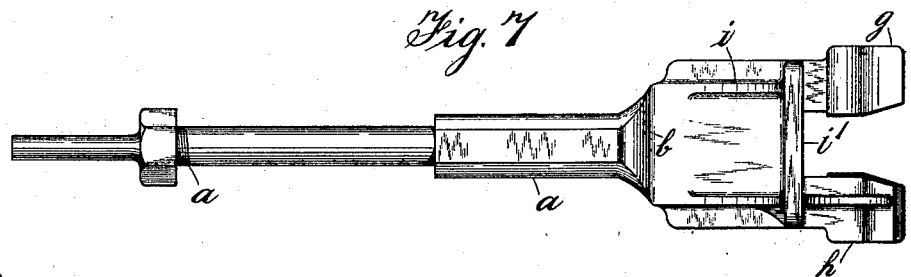

No. 752,605. PATENTED FEB. 16, 1904.
J. THOMAS.
AUTOMATIC COUPLING AND BUFFER.
APPLICATION FILED JUNE 29, 1903.
NO MODEL. 5 SHEETS—SHEET 4.

No. 752,605. PATENTED FEB. 16, 1904.
J. THOMAS.
AUTOMATIC COUPLING AND BUFFER.
APPLICATION FILED JUNE 29, 1903.
NO MODEL. 5 SHEETS—SHEET 5.
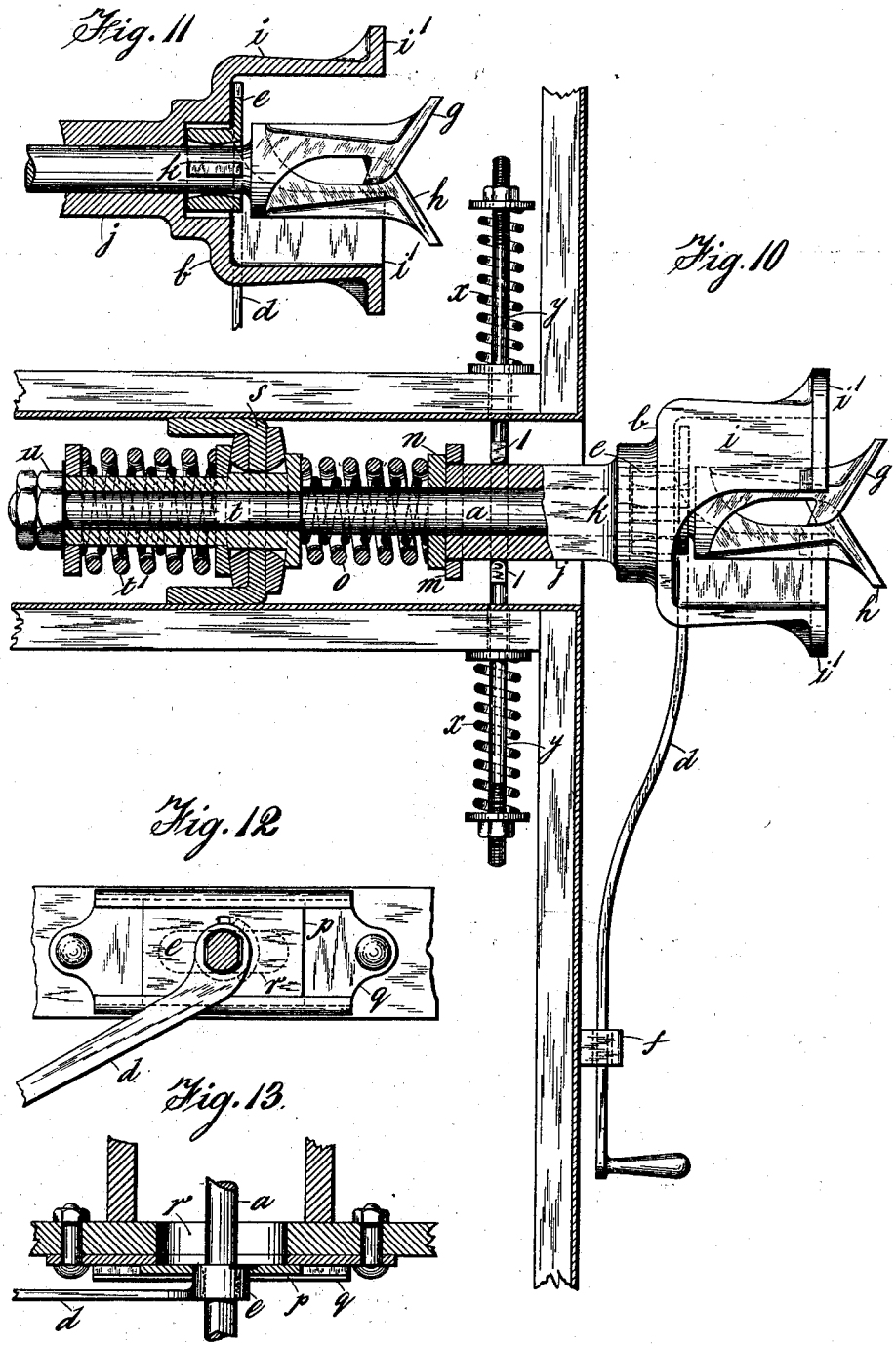

No. 752,605. Patented February 16, 1904.

UNITED STATES PATENT OFFICE.

JOHN THOMAS, OF BALHAM, ENGLAND.

AUTOMATIC COUPLING AND BUFFER.

SPECIFICATION forming part of Letters Patent No. 752,605, dated February 16, 1904.

Application filed June 29, 1903. Serial No. 163,597. (No model.)

*To all whom it may concern:*

Be it known that I, JOHN THOMAS, a subject of the King of Great Britain, of 17 Ormeley road, Balham, in the county of Middlesex, England, have invented new and useful Improvements in Automatic Couplings and Buffers, of which the following is a specification.

My invention relates to improvements in automatic couplings and buffers for railway-carriages and vehicles in which a coupling is arranged at each end of the frame, consisting of a cylindrical shank provided at its inner end with nuts, washers, buffing-springs, and draw-springs of the kinds usual on railways, and at its outer end a head forming part of it, and upon the shank near the head a lever fitting freely on it and extending as far as the side of the carriage or truck and working in a guide fixed in the latter, the head of the coupling, looking at it from its outer end, having upon it two projections in the form of hooks on the right-hand top corner and on the left-hand bottom corner, respectively. When two vehicles come together for the purpose of coupling, the ends of the projections on the heads, which are formed with curved or inclined faces, come in contact and the movement of the vehicle or vehicles causes one or both couplings to revolve or twist in their bearings in the vehicles, raising the side lever until the shoulders of the hooks on the projections of one coupling pass the shoulders of the hooks on the projections of the coupling of the adjoining vehicle, when the weight of the lever causes it to drop, the shoulders on the projecting hooks falling or twisting into one another, the lever being held in the down or coupled position by an automatic catch or by a pin fitted to the guide. By raising the lever by hand the vehicles become uncoupled.

The objects of my present improvements are, first, to provide flanges serving as buffing-faces upon the coupling projections, such as those described; second, to provide a sliding guide for the shank of the coupling where it passes through the end frame of the carriage; third, to provide means for preventing the side lever from being displaced longitudinally; fourth, to provide springs for bringing back the shanks to their central position after they have been displaced laterally in passing round curves, and, fifth, to provide fastenings by which the levers are secured in their normal position. I attain these objects by the means illustrated in the accompanying drawings, in which—

Figure 2:
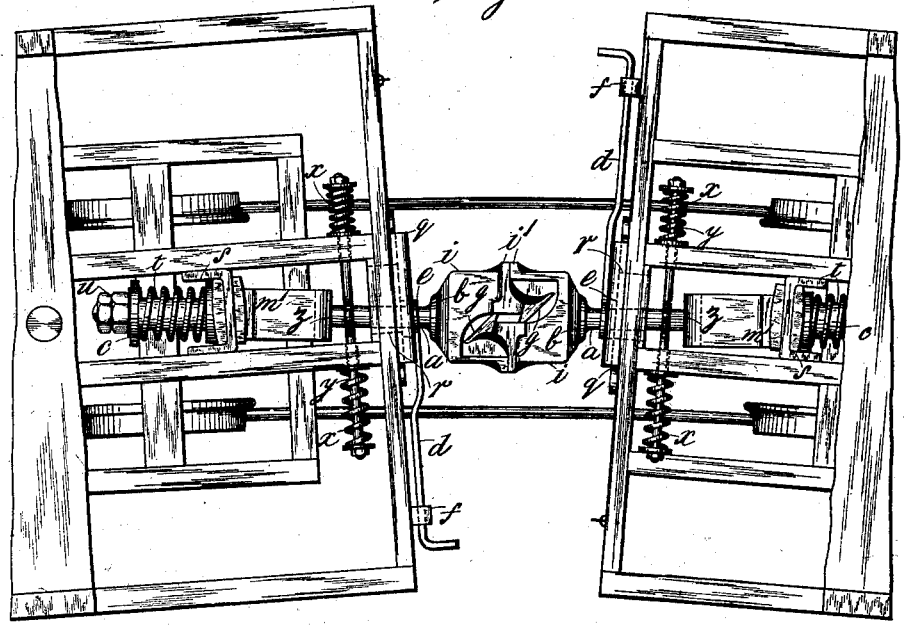
Figure 8:
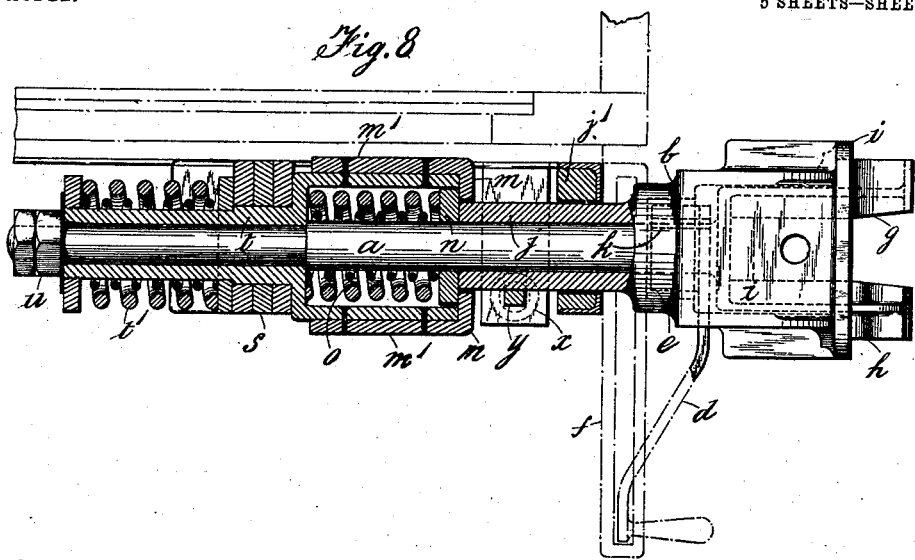
Figure 9:
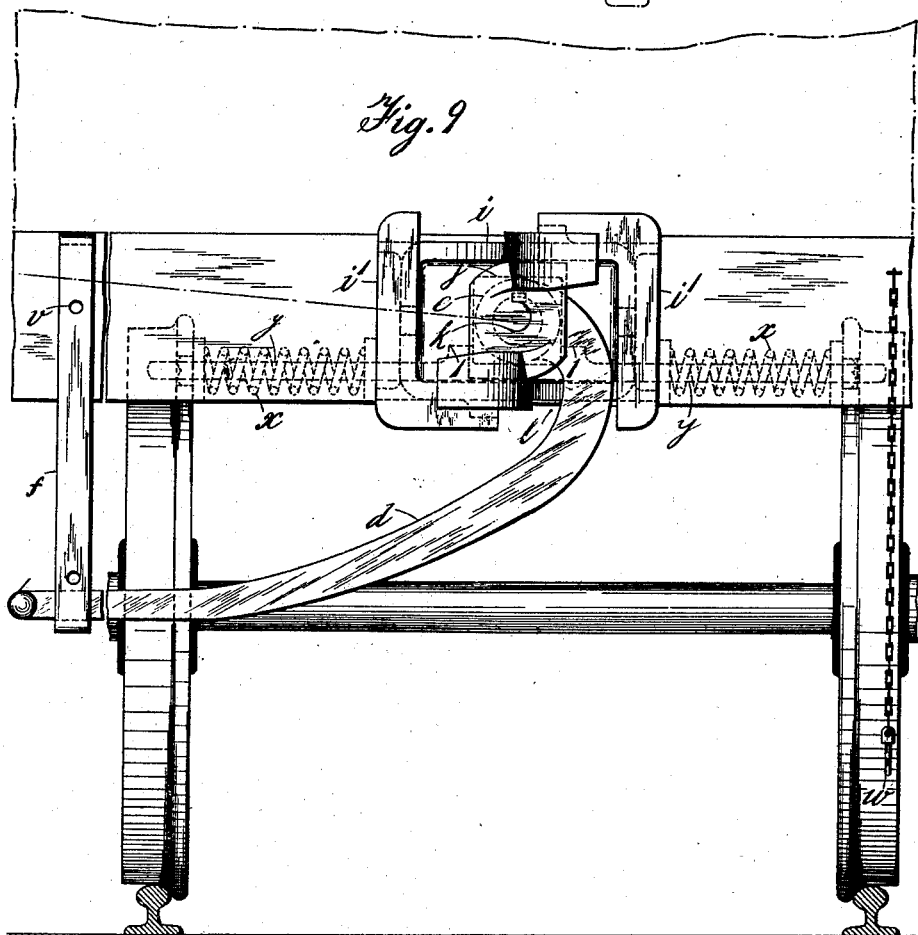

Figure 1 is a plan, partly in section, of two vehicles coupled together upon a straight line of rails. Fig. 2 is a similar view upon a curved line. Fig. 3 is a side view, partly in section, on a larger scale, of the coupling. Fig. 4 is a plan of the same. Fig. 5 is a front view of the coupling. Fig. 6 is a transverse vertical section on the line A B in Fig. 3. Fig. 7 is a plan, upon a smaller scale, of the coupling upon its shank. Fig. 8 is a side view, partly in section, showing a separate buffer-box sliding upon the shank of the coupling. Fig. 9 is a front view of the same. Fig. 10 is a plan, partly in section, of the same. Fig. 11 is a detailed view, partly in section, showing the separate buffer-box. Fig. 12 is a front detailed view of the slide for allowing the coupling to move laterally when going round curves. Fig. 13 is a horizontal section of the same.

Similar characters refer to similar parts throughout the several views.

Referring first to Figs. 1, 2, 3, 4, 5, 6, and 7, coupling apparatus of the kind described above consists of a strong cylindrical shank $a$ of steel, having a head $b$. The shank $a$ is screw-threaded at its inner end and is fitted with nuts, washers and buffing and draw springs of the usual kind, Figs. 1 and 2, and shown in detail in Figs. 8 and 10. A lever $d$ has at its end an eye $e$, fitting freely upon the shank $a$, but of such shape that it cannot turn upon the latter. (See Figs. 3, 4, 5, 6, 7.) The lever extends to the side of the vehicle and is guided by a guide $f$ fixed to the frame of the latter, a hole at $v$, Fig. 9, being made in the upper end of the guide to receive a movable pin $w$, suspended by a suitable chain, by which the lever can be retained in its raised position. $g$ $h$ are the two projecting hooks upon the outer face of the head $b$ of the shank $a$, one of the hooks being at one side of the upper part of the head $b$ and the other one at the opposite side of the lower part, so that if the couplings of two vehicles be brought together the hooks upon one vehicle will engage with those on the other vehicle, (the hooks of which are turned in the opposite direction,) the respective shanks $a$ turning round their centers sufficiently to allow them to do so, and the lever $d$ being thereby raised. When the points of the hooks $g$ $h$ have passed one another, the weight of the lever $d$ brings them back to their proper engaging position again, and they are securely coupled and are kept so until the lever $d$ is raised by hand for the purpose of uncoupling them.

My invention consists in providing upon the outer ends of the shanks $a$ and heads $b$ strong steel box-like flanges $i$, the outer edges of which, $i''$, are at right angles to the center line of the shank $a$, so that when two vehicles are brought together the flanges $i''$ press rigidly and squarely against each other, as shown in Fig. 2, so that the two couplings form practically one, the two shanks $a$ being in line with each other and the flanges $i''$ upon both being in close contact.

The flanges $i''$ may be formed in one piece with the hooked projections $g$ $h$, the head $b$, and the shank $a$, as shown in Figs. 1, 2, 3, 4, 5, 6, and 7, or they may be separate from the hooked projections and shank, as shown in Figs. 8, 9, 10, and 11, the head $b$ being provided with a central boss or sleeve $j$, square in section and fitting freely upon the cylindrical shank $a$, upon which the hooked projections $g$ $h$ are formed. In this arrangement the eye $e$ of the lever $d$ fits freely upon the cylindrical shank $a$ and is prevented from turning upon the latter by a key $k$, Figs. 8, 9, and 10. The boss $j$ is extended back, so as to form the sleeve round the shank $a$. The eye $e$ of the lever $d$ is contained in a recess in the boss $j$ at the back of the flanged box $i$, which has an opening $l$ for the lever $d$ to pass through. (See Fig. 9.) Upon the inner end of this sleeve $j$ fits freely the fixed plate $m$, upon which are formed top and bottom plates $m'$, which are secured to corresponding plates formed upon the enlarged part of the sleeve $t$, which contains the buffing-spring $o$. $t'$ is the draw-spring at the back end of the shank $a$, and $s$ is the fixed abutment for this draw-spring, on either side of which strong curved plates are fitted. The front part of the square sleeve $j$ is guided freely in the transverse guide $j''$, Fig. 8, fixed to the frame of the vehicle and having a transverse elongated opening, allowing the sleeve with the shank $a$ to move laterally.

The object of making the buffing-flanges $i''$ separate from the shank $a$ and coupling-hooks $g$ $h$ is that the latter may be turned round by the lever $d$ sufficiently to uncouple the coupling without affecting the buffing-flanges $i''$ when the latter are held tightly together.

In Figs. 1, 2, 3, and 4 and in detail in Figs. 12 and 13 a vertical plate $p$ is shown, sliding laterally and guiding the shank $a$, which passes through it. This lateral movement is necessary to enable the tight couplings between two vehicles to remain in line with each other when going round curves, as illustrated in Fig. 2. The sliding plate $p$ slides horizontally in a guide $q$, fixed to the ends of the frame of the vehicle, and it has a central hole into which the eye or boss $e$ of the lever $d$ fits, this eye fitting freely upon the shank $a$, as already described, and the hole through it being rounded, so that the shank may move from side to side (in going round curves) without interfering with the proper position of the lever in its guide $f$. An elongated hole $r$ for the passage of the shank $a$ is made through the guide $q$ and through the end of the vehicle. A small projection is shown at the back of the eye or boss $e$, which moves in a corresponding recess at the back of the sliding plate $p$ and prevents the lever $d$ from moving endwise. The shank $a$, Fig. 10, passes through a sleeve $t$, which itself passes through the abutment $s$ for the buffer-spring $o$, and the shank $a$ is shown continued back through the sleeve $t$ and through a draw-spring $t'$, its end being fitted with adjustable nuts $u$. The hole through the abutment $s$ is rounded, as shown, to allow the lateral movement of the shank $a$ and coupling-hooks on curves.

In order to bring back the shanks $a$ and the coupling to their central position and to retain them there when uncoupled, so as to insure their proper coupling, I arrange springs $x$ $x$, Figs. 1, 2, 8, 9, and 10, upon each side of the shank $a$ under the vehicle.

In Figs. 1 and 2, $y$ is a transverse bar passing through guides in the frame and having a central eye $z$, through which the shank $a$ passes freely. The ends of the bar $y$ after passing through the springs $x$ $x$ are fitted with washers and nuts, by which the compression of the springs is adjusted.

If the line of the couplings has been moved laterally, as shown in Fig. 2, in going round a curve, the shanks are brought back by the springs to their central position when uncoupled, so that they always remain in their proper position for automatically coupling when two vehicles are brought together.

In Figs. 8, 9, and 10, in which the buffer-flanges $i''$ must be prevented from turning with the shank $a$, the transverse bar $y$ passes underneath the square sleeve $j$ and is provided with two upwardly-projecting lugs 1 1, which freely embrace the lower edge of the sleeve $j$. The inner edges of the lugs 1 1 are rounded (see Fig. 10) to allow the lateral angular movement of the sleeve and shank, while preventing the sleeve from turning round. The springs upon the bar $y$ are arranged and adjusted in the manner already described.

I make holes in two opposite sides of the buffer-box, which contains the coupling, through which a coupling-pin may be passed, so that if it is desired to couple one of the vehicles to another having an ordinary coupling-chain a link of the latter may be passed between the coupling-hooks and the buffer-box and the coupling-pin passed through it and through the sides of the box.

Having fully described my invention, what I claim, and desire to secure by Letters Patent, is—

1. In an automatic coupling the combination of coupling-hooks, a rotary support for said hooks, and an uncoupling-lever carried by said rotary support.

2. In an automatic coupling the combination of coupling-hooks, a rotary support for said hooks, an uncoupling-lever carried by said rotary support and means for locking said uncoupling-lever.

3. In an automatic coupling, the combination of coupling-hooks, a support for said hooks capable of lateral and rotary movement, an uncoupling-lever carried by said support for rotating said hooks, means for locking said lever, and means for automatically controlling the lateral displacement of said support when moved out of its normal position.

4. In an automatic coupling, the combination of coupling-hooks, a support for said hooks capable of lateral and rotary movement, an uncoupling-lever carried by said support for rotating said hooks, means for locking said lever, and a laterally-disposed spring-operated bar engaging said support for automatically controlling its lateral displacement when moved out of its normal position.

5. In an automatic coupling and buffer, the combination of a laterally-movable hollow draw-head, provided with buffer-flanges, a rotary shank carrying coupling-hooks extending in said hollow head, means for rotating said shank and hooks independently of said head, and means for locking said shank against rotary movement.

6. In an automatic coupling and buffer, the combination of a laterally-movable hollow draw-head, provided with buffer-flanges, a rotary shank carrying coupling-hooks extending in said hollow head, means for rotating said shank and hooks independently of said head, comprising an uncoupling-lever carried by said shank, and means for locking said lever.

7. In an automatic coupling and buffer, the combination of a laterally-movable hollow draw-head, provided with buffer-flanges, a rotary shank carrying coupling-hooks extending in said hollow head, means for rotating said shank and hooks independently of said head, means for locking said shank against rotary movement, and means for automatically controlling the lateral displacement of said shank and draw-head when moved out of their normal positions.

8. In an automatic coupling and buffer, the combination with the car-body, of a hollow draw-head provided with buffer-flanges and a hollow sleeve supported by and laterally movable in said car-body, of a shank rotatably supported in said hollow sleeve, draw and buffer springs engaging said shank, coupling-hooks in said hollow head carried by said shank, means for rotating said shank and hooks independently of said head, and means for locking said shank and hooks against rotary movement.

9. In an automatic coupling and buffer, the combination with the car-body, of a hollow draw-head provided with buffer-flanges and a hollow sleeve supported by and laterally movable in said car-body, of a shank rotatably supported in said hollow sleeve, draw and buffer springs engaging said shank, coupling-hooks in said hollow head carried by said shank, means for rotating said shank and hooks independently of said head, means for locking said shank and hooks against rotary movement, and means for controlling the lateral displacement of said buffer-heads, shank and hooks when moved out of their normal positions.

10. In an automatic coupling and buffer, the combination of a shank, projecting coupling-hooks and a head, said head being provided with box-like flanges and said flanges terminating in flat flanges adapted to abut against corresponding flanges on the coupling of another car, substantially as described.

11. In an automatic coupling and buffer, the combination of couplings having flanges adapted to abut against each other, shanks supporting said flanges, projecting hooks carried by each of said shanks, and springs to bring said shanks into their normal position after they have been displaced by the action of a train in running around a curve, substantially as described.

12. The combination in an automatic coupling and buffer of a cylindrical shank $a$, head $b$, projecting coupling-hooks $g$, $h$, with a square sleeve $j$ fitting freely on the shank $a$ and at its outer end box-like flanges $i$ with flanges $i'$ forming a buffer, guide $j'$, uncoupling-lever $d$ loose upon a key $k$ on shaft $a$, guide $f$, washer $m$, buffer-spring $o$, sleeve $t$, abutment-plate $s$, draw-spring $t'$, and nuts and washer $u$, substantially as set forth.

13. The combination with the shank $a$, of the sliding plate $p$, guide $q$, projection upon eye $e$ of uncoupling-lever $d$, and recess in sliding plate $p$ receiving the projection upon eye $e$, substantially as set forth.

14. The combination with the square sleeve $j$, of transverse bar $y$, springs $x$, $x$, and projections 1, 1, embracing square sleeve $j$, substantially as set forth.

15. The combination with the shank $a$ of transverse bar $y$, eye $z$, surrounding shank $a$ and springs $x$, $x$, substantially as set forth.

In witness whereof I have hereunto set my hand in the presence of two witnesses.

JOHN THOMAS.

Witnesses:
  EDMUND EDWARDS,
  ALFRED T. BRATTON.